(12) United States Patent
Bleier

(10) Patent No.: US 6,729,735 B2
(45) Date of Patent: May 4, 2004

(54) LATERAL TRANSFER RETROREFLECTOR ASSEMBLY AND METHOD OF ASSEMBLING THE SAME

(75) Inventor: Zvi Bleier, Centerport, NY (US)

(73) Assignee: PLX, Inc., Deer Park, NY (US)

( * ) Notice: Subject to any disclaimer, the term of this patent is extended or adjusted under 35 U.S.C. 154(b) by 55 days.

(21) Appl. No.: 09/894,207

(22) Filed: Jun. 28, 2001

(65) Prior Publication Data

US 2003/0002178 A1 Jan. 2, 2003

(51) Int. Cl.[7] ............................. G02B 5/08; G02B 7/182
(52) U.S. Cl. .................... 359/856; 359/857; 359/861
(58) Field of Search ................................. 359/402, 405, 359/406, 431, 834, 836, 856, 857, 861

(56) References Cited

U.S. PATENT DOCUMENTS

| | | | |
|---|---|---|---|
| 621,283 A | * | 3/1899 | Pulfrich |
| 784,487 A | * | 3/1905 | Goerz et al. |
| 1,635,011 A | * | 7/1927 | Sadler |
| 2,167,657 A | * | 8/1939 | Karnes |
| 3,966,298 A | * | 6/1976 | Chapman |
| 3,977,765 A | | 8/1976 | Lipkins |
| 4,065,204 A | | 12/1977 | Lipkins |
| 4,704,000 A | * | 11/1987 | Pekar et al. |
| 5,024,514 A | | 6/1991 | Bleier et al. |
| 5,122,901 A | * | 6/1992 | Bleier |
| 5,134,519 A | * | 7/1992 | Abele et al. |
| 5,301,067 A | * | 4/1994 | Bleier et al. |
| 5,335,111 A | * | 8/1994 | Bleier |
| 5,361,171 A | | 11/1994 | Bleier |

* cited by examiner

Primary Examiner—Ricky D. Shafer
(74) Attorney, Agent, or Firm—Michael R. Gilman; Kaplan & Gilman, LLP

(57) ABSTRACT

An improved lateral transfer retroreflector assembly is provided. The lateral transfer retroreflector assembly of the invention comprises a first segment comprising a mirror panel housing, a second segment comprising a roof mirror housing, and a third segment comprising an off-the-shelf connecting member between the two housings. The mirror panel housing will have mounted thereto a mirror panel. The roof mirror housing will have mounted thereto a roof mirror assembly, and the connecting member will be mounted between the mirror panel housing and the roof mirror housing. The off-the-shelf aspect of assembling the connecting allows the assembly to be built to customer specifications, thereby allowing for customized creation of lateral transfer retroreflectors, but at a time and cost savings to the customer.

18 Claims, 13 Drawing Sheets

LATERAL TRANSFER RETROREFLECTOR ASSEMBLY AND METHOD OF ASSEMBLING THE SAME

BACKGROUND OF THE INVENTION

This invention relates to the field of retroreflectors, and more particularly, to lateral transfer retroreflectors.

Retroreflectors generally have the property of causing incident and reflected light rays to travel along parallel paths. To achieve this parallelism, a retroreflector normally consists of three optically flat reflecting surfaces, each reflecting surface positioned at a right angle to each of the other reflecting surfaces. Any departure of the reflecting surfaces from their perpendicular orientation will cause the incident and reflected light rays to depart from parallel.

Retroreflectors lose accuracy when they are exposed to external stresses. Examples of such external stresses are mass, thermal expansion or contraction of the substrate material from which the retroreflector is made, or deflection caused by curing of the adhesives which join members of the retroreflector.

Retroreflectors, and lateral transfer retroreflectors (which translate the reflected beam some calculated distance from the incident light beam), are old in the art. Examples of prior art retroreflectors and lateral transfer retroreflectors are:

U.S. Pat. No. 3,977,765 to Morton S. Lipkins, which disclosed a retroreflector mounted to a support structure through means of applying an adhesive into the joints formed between joined members of the retroreflector and to a flat surface of the support structure.

U.S. Pat. No. 4,065,204, also to Morton S. Lipkins, which disclosed a lateral transfer retroreflector consisting of a base, a roof reflector having two reflecting plates and a third reflector. The base acts as an extension of the third reflector by attaching the third reflector to the roof reflector in the manner known to retroreflectors to produce the lateral transfer retroreflector construction.

U.S. Pat. No. 5,024,514 to Zvi Bleier and Morton S. Lipkins, which discloses a lateral transfer retroreflector having a tubular member, a roof mirror and a mirror panel. Both the roof mirror and mirror panel are attached to the tubular member by use of three coplanar mounting pads.

U.S. Pat. No. 5,361,171, also to Zvi Bleier, which discloses a lateral transfer retroreflector having a fixed-length tubular member, a roof mirror secured within a channel portion extending from an end of the tubular member and a mirror panel attached to the tubular member at the opposite end from the roof mirror and roof mirror panel.

It would be desirable to provide a high-accuracy lateral transfer retroreflector that is off-the-shelf adjustable as to the displaced length between the mirror panel and the roof mirror and also having a less temperature-deviant assembly and mounting of the roof mirror and mirror panel.

SUMMARY OF THE INVENTION

In accordance with the invention, an improved lateral transfer retroreflector assembly is provided. The lateral transfer retroreflector assembly of the invention is comprised of three separate, attached segments. A first segment comprising a mirror panel housing, a second segment comprising a roof mirror housing, and a third segment comprising a connecting member between the two housings.

The mirror panel housing will have mounted thereto a mirror panel. The roof mirror housing will have mounted thereto a roof mirror assembly, and the connecting member will be mounted between the mirror panel housing and the roof mirror housing. In addition, based upon the mounting together of the three separate segments, the connecting member will have the ability of being an off-the-shelf member that is selectively able to be cut to a particular length dimension based upon customer specifications, thereby allowing for customized creation of lateral transfer retroreflectors, but at a time and cost savings to the customer.

In addition, the roof mirror assembly and the mirror panel mounting are kinematic structures that are also improvements over earlier constructions. In particular, the roof mirror assembly of the subject invention has at least a pair of mounting members that act also as back supports and are located substantially at opposite ends of the roof mirror. The manner of attachment of the mounting members to the back portions of the mirror panels making up the roof mirror assembly, is such that expansion and contraction of the reflective surfaces of the mirror panels of the roof mirror assembly will only be in a direction substantially perpendicular to the direction of the roof angle axis. Deflection in this direction does not cause displacement (error), of the transmitted light beam traveling through the lateral transfer retroreflector, and therefore such a mounting system is advantageous. Similarly, the mounting of the mirror panel to the mirror panel housing by means of substantially 45° chamfered edges, insures that the forces exerted by thermal expansion or contraction of the bonding material situated along those chamfered edges, will have a canceling effect, and not deflect the reflective surface of the mirror panel.

Accordingly, it is an object of the present invention to provide an improved lateral transfer retroreflector assembly.

Still another object of the invention is to provide a lateral transfer retroreflector assembly having a component construction capable of, allowing for off-the-shelf customization for different customer needs based upon differing customer specifications.

Yet a further object of the invention is to provide a lateral transfer retroreflector assembly having a roof mirror assembly construction and mounting such that deformations in the reflective surfaces of the mirror panels of the roof mirror assembly due to thermal expansion/contraction are minimized in the direction of the roof angle axis.

A still further object of the invention is to provide a lateral transfer retroreflector assembly, wherein the deflective forces exerted on the mirror panel by thermal expansion or contraction of the joint bonding the mirror panel to the mirror panel housing, are minimized.

Other objects of the invention will in part be obvious and will in part be apparent from the following description taken in association with the figures.

The invention accordingly comprises an assembly possessing the features, properties and relation of components which will be exemplified in the products hereinafter described, and the scope of the invention will be indicated in the claims.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

Figure 1:
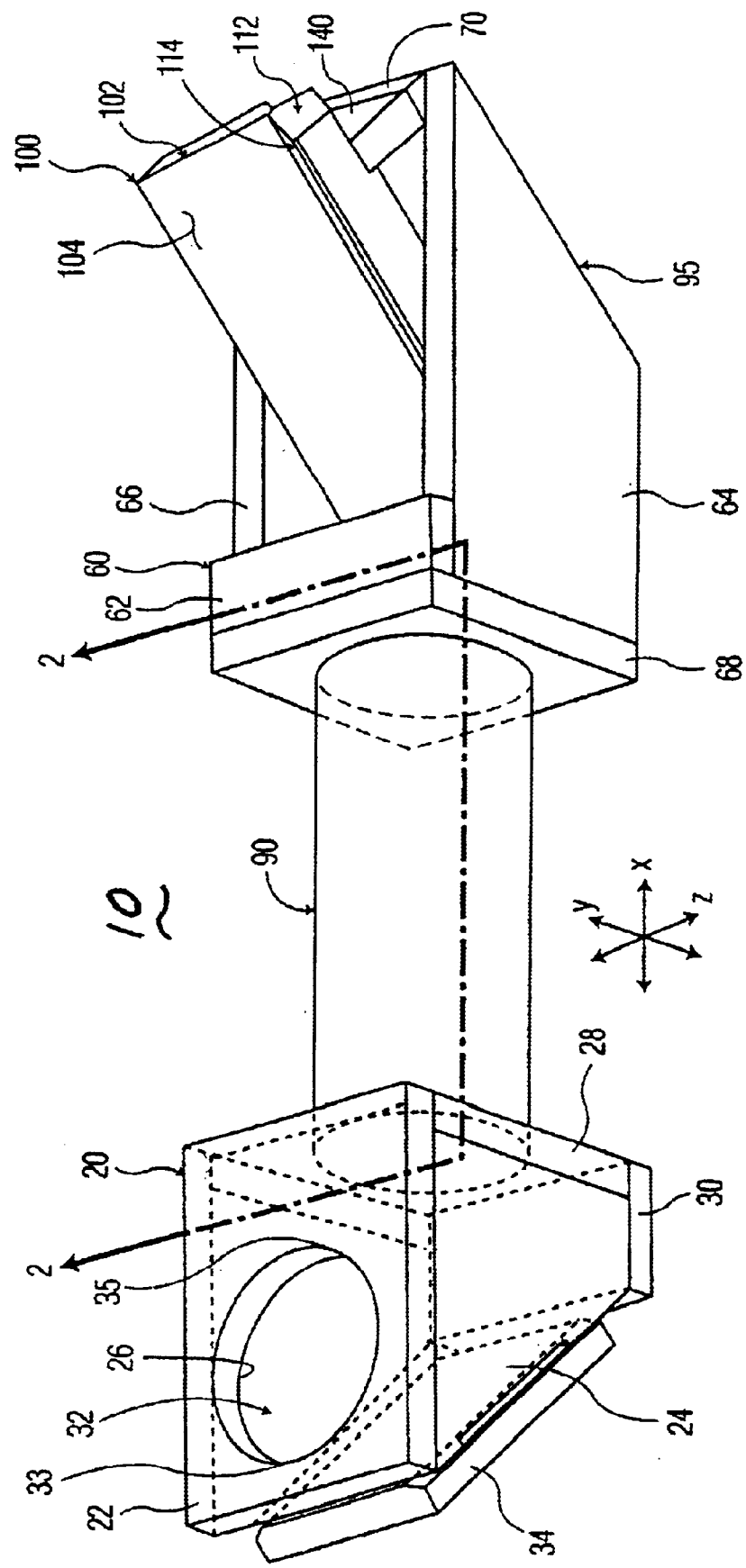
FIG. 1 is a perspective view of a lateral transfer retroreflector assembly made in accordance with the invention.

Referring to FIG. 1, a lateral transfer retroreflector assembly made in accordance with the invention and generally designated at 10, is illustrated. Lateral Transfer Retroreflector ("LTR") 10 comprises three components; those being a mirror panel housing 20, a roof mirror assembly housing 60 and a connecting member 90, having a thickness 92.

Figure 4:
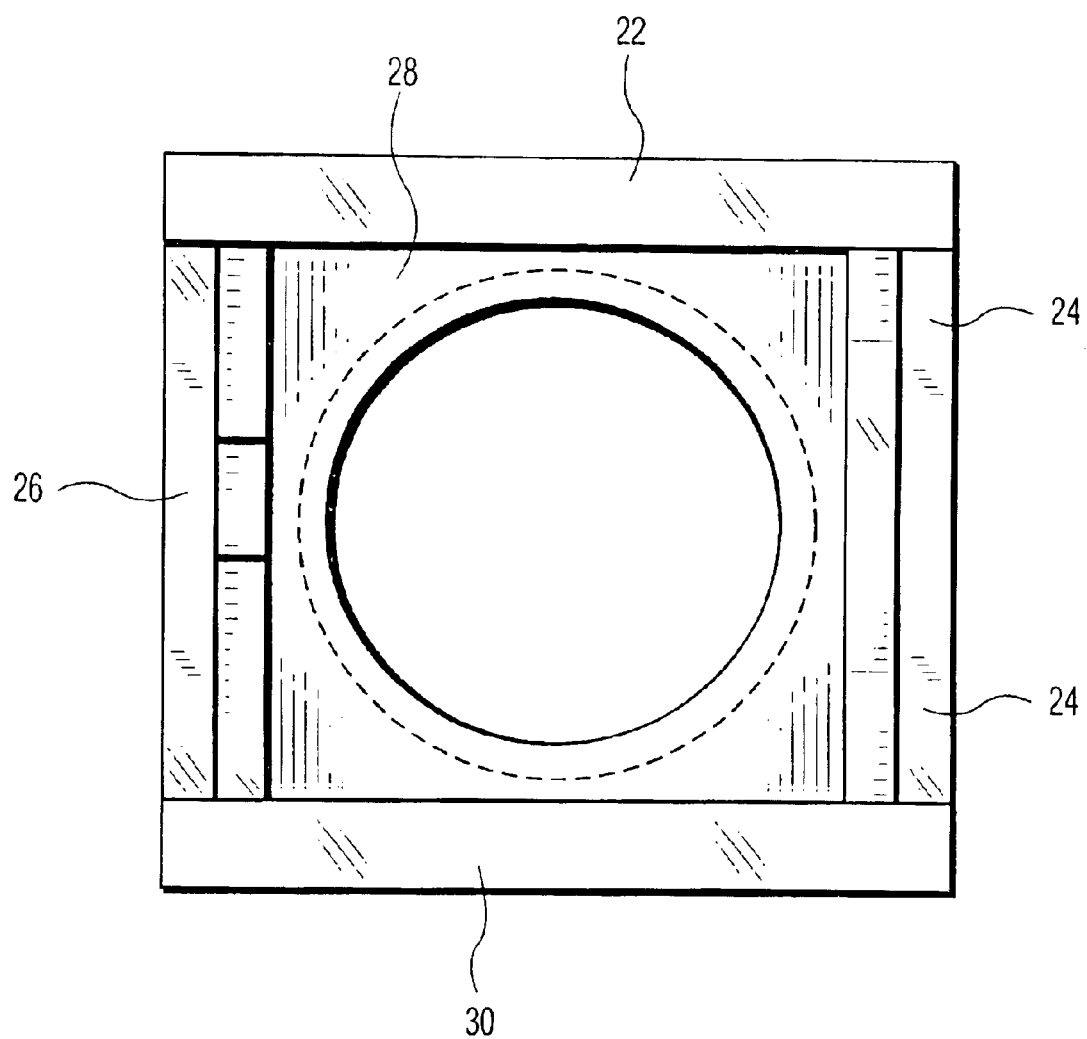
FIG. 4 is a left side elevational view of the mirror panel housing of the invention.

As seen in FIGS. 1 and 4, mirror panel housing 20 is comprised of first and second side members 24 and 26, as well as receiving member 28, for receiving connecting member 90. Housing 20 can also include member 30, to lend extra stability to the structure, as well as aperture receiving member 22, having aperture 32 extending therethrough. Aperture 32 can be of any geometric configuration, the preferred configurations being in the circle and square families. Aperture 32 has a first end 33 and a second end 35, the distance between which will help dictate the inside diameter of connecting member 90. It is to be understood herein that member 90 does not have to be circular in cross section, but could be of other shapes; particularly square. However, since light beams to be passed through LTR 10 are normally themselves circular in cross section, the preferred embodiment shown in the figures and discussed herein, will regard a circular aperture 32 and a circular tubular member 90.

Continuing with the above discussion, the dimensional congruity between the size of aperture 32 and the cross sectional diameter of member 90 will insure that a light beam passing through LTR 10 will propagate through member 90 very close to the inside surface of member 90 as the beam approaches either of ends 33 or 35 of aperture 32.

Figure 2:
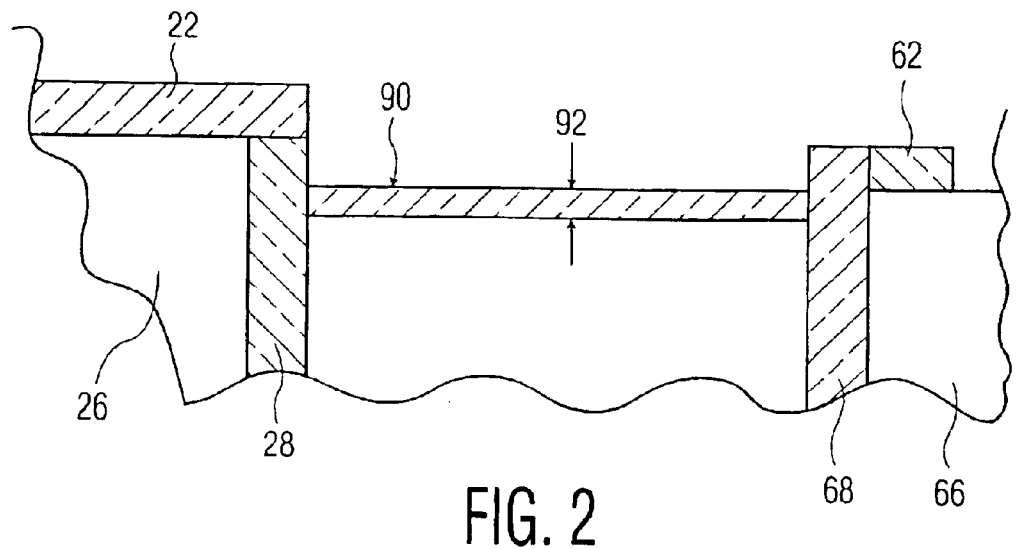
FIG. 2 is a cross-sectional view taken along line 2—2 of FIG. 1.

It is also seen in FIGS. 1 and 2 that roof mirror assembly housing 60 is comprised of side members 64 and 66, receiving member 68, as well as a top member 62. Receiving members 28 of mirror panel housing 20 and 68 of roof mirror assembly housing 60, receive connecting member 90 to join housings 20 and 60 into a complete lateral transfer retroreflector assembly 10.

Figure 3:
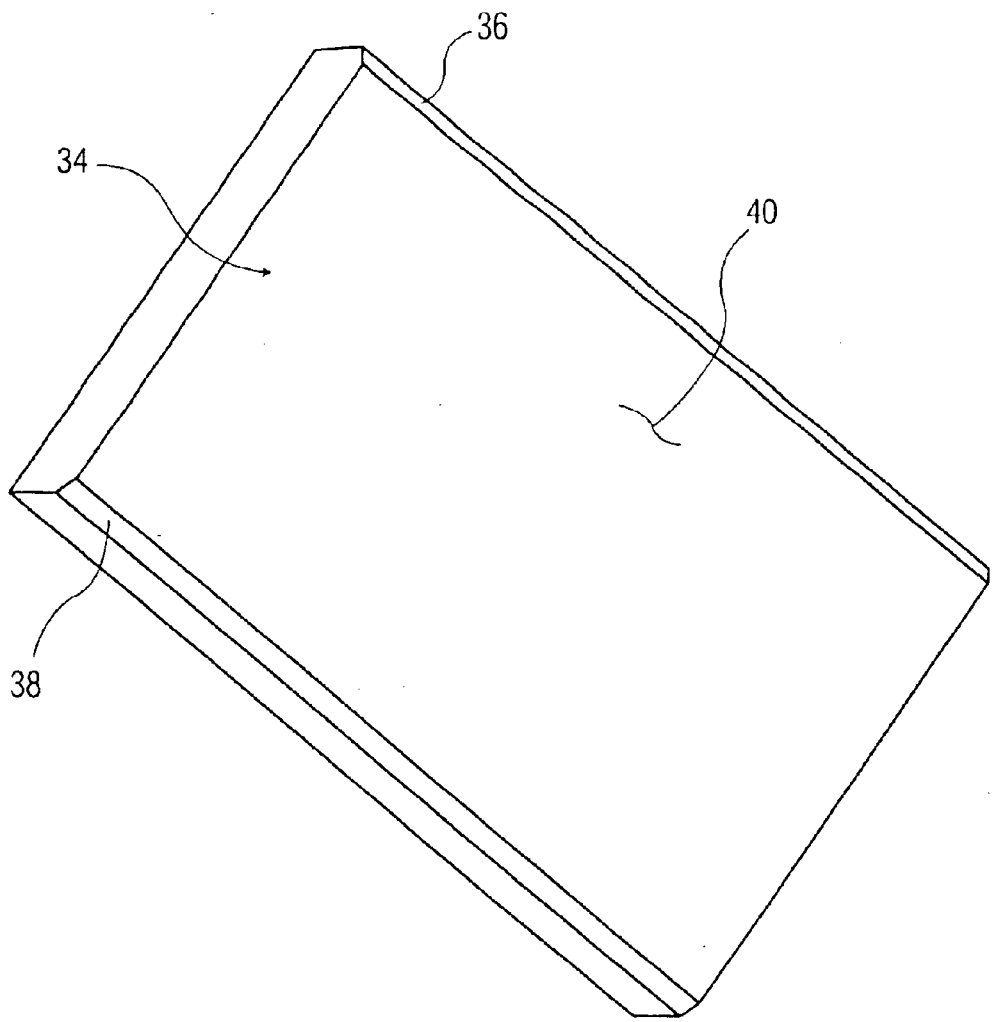
FIG. 3 is a perspective view of the mirror panel of the invention.

Turning now to FIG. 3, mirror panel 34 to be used with LTR 10 is shown. Mirror panel 34 has a reflective surface 40, and two chamfered edges 36 and 38. As seen in FIG. 1, mirror panel 34 is adhered to mirror panel housing 20 in such a manner as to be oriented with its reflective surface 40 below, and in reflective relation with, aperture 32 and member 90. In practice, and as will be discussed in more detail below, the light beam, if it is entering LTR 10 through aperture 32, will then reflect off of reflective surface 40 of mirror panel 34, and propagate through member 90 into roof mirror assembly housing 60, where it will reflect off of reflective surfaces 104 and 114 of roof mirror assembly 100 to propagate back toward the source of the beam, in a direction substantially parallel to the beam's incident direction, but at a displaced distance, substantially based upon the length of member 90.

Figure 4A:
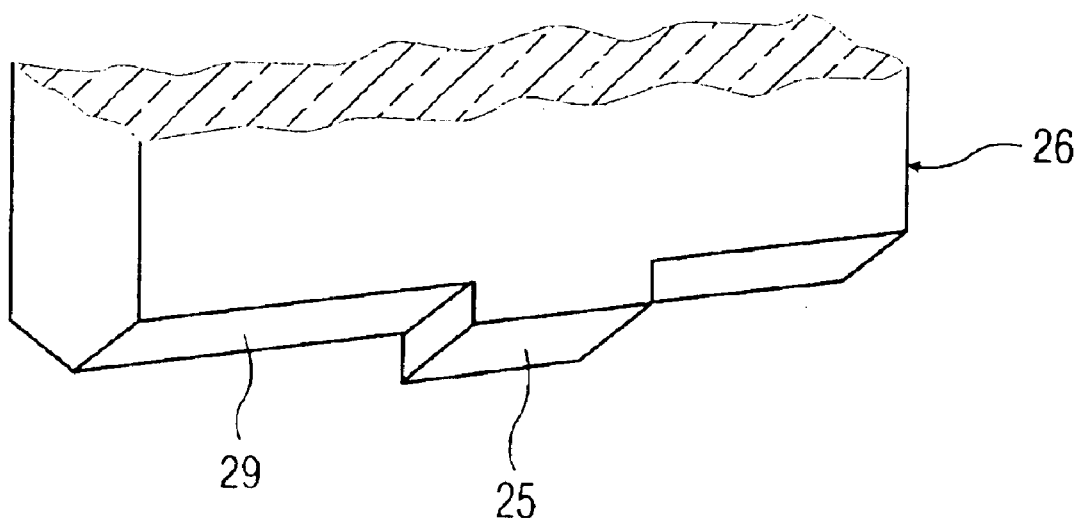
FIG. 4A is a partial prespective view of the mounting pad of member 26 of the mirror panel housing.
Figure 4B:
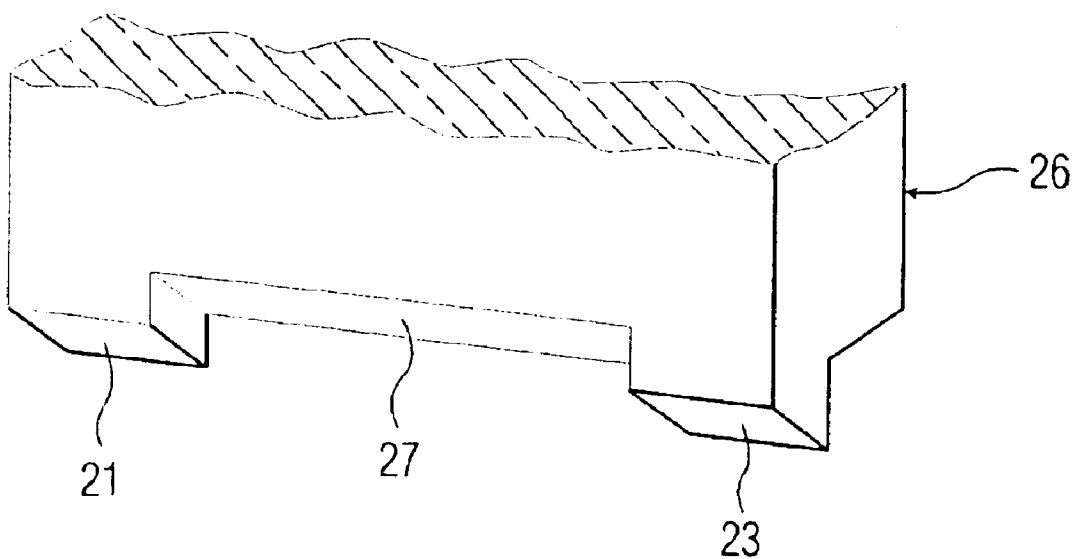
FIG. 4B is a partial perspective view of the mounting pad of member 24 of the mirror panel housing.
Figure 5:
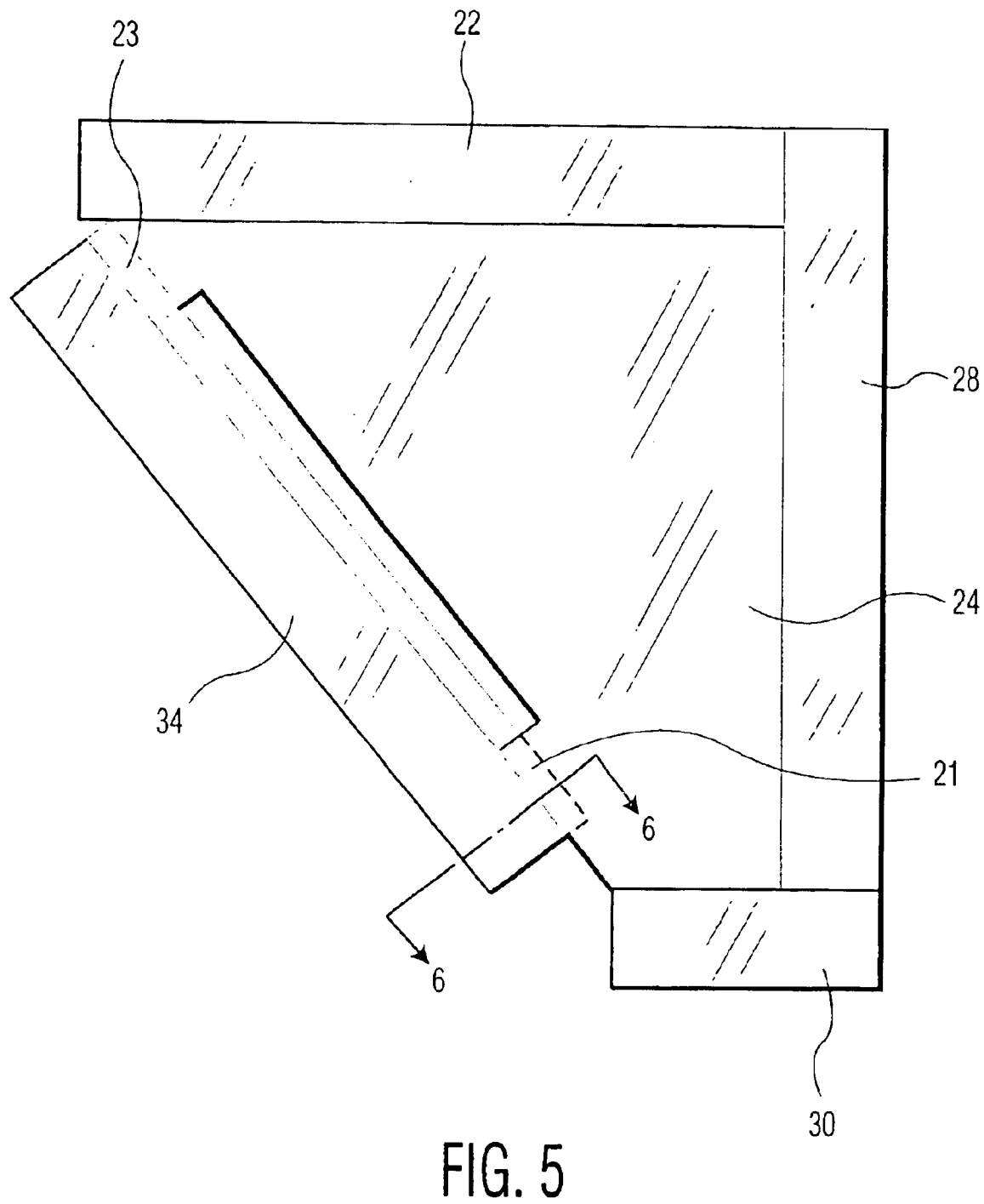
FIG. 5 is a right side elevational view of the mirror panel housing.
Figure 6:
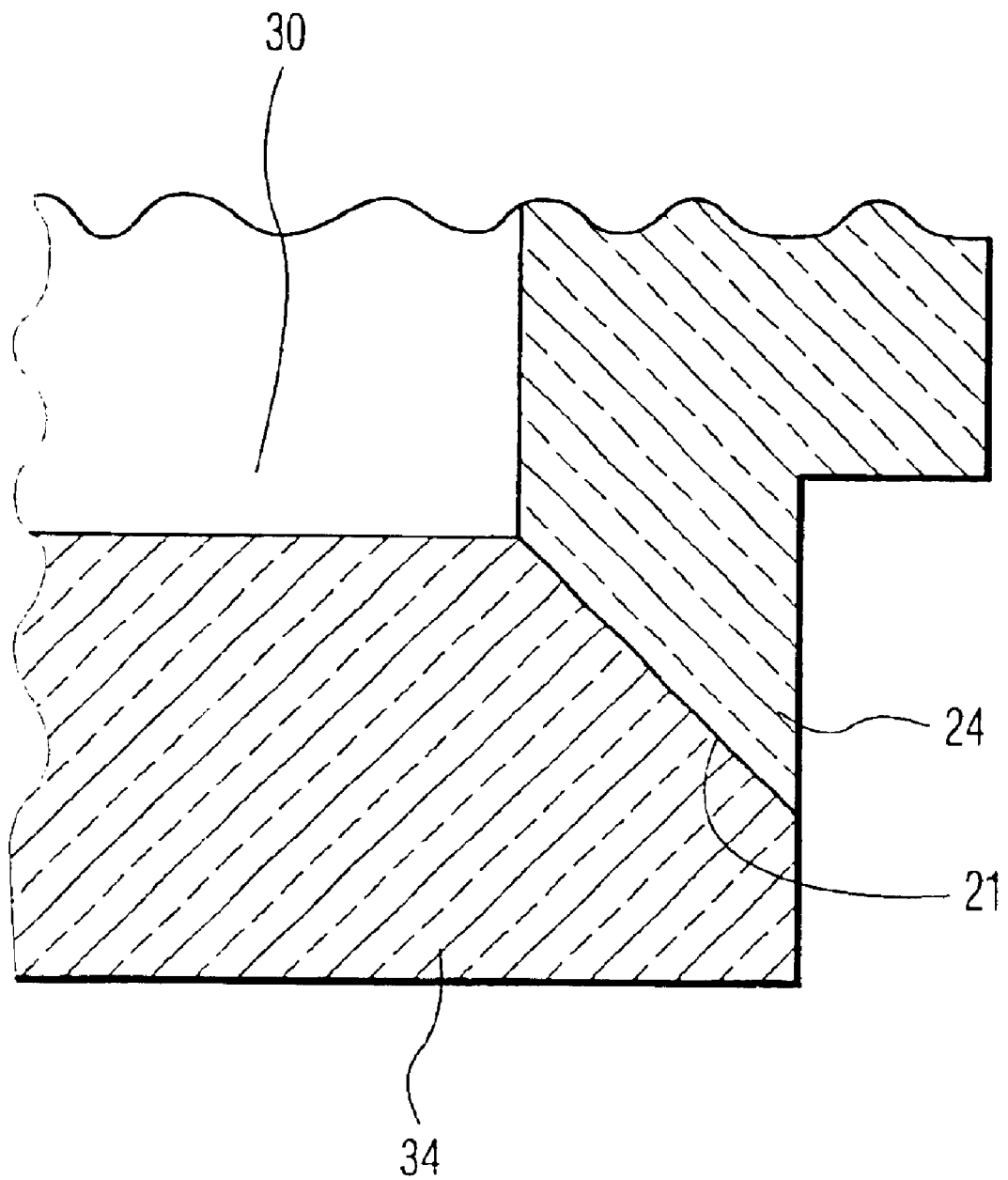
FIG. 6 is a cross-sectional view taken along line 6—6 of FIG. 5.
Figure 7:
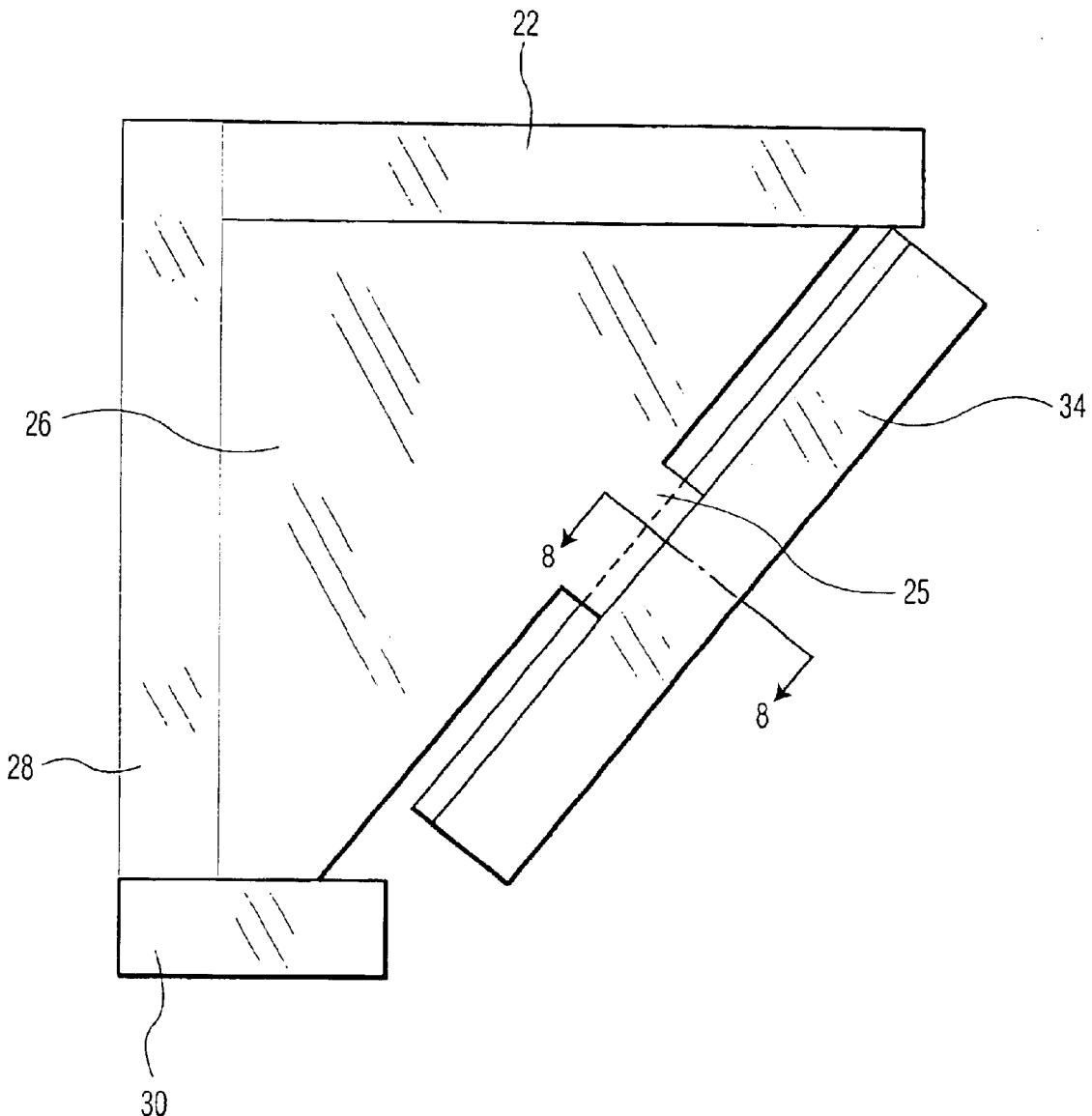
FIG. 7 is a left side elevational view of the mirror panel housing.
Figure 8:
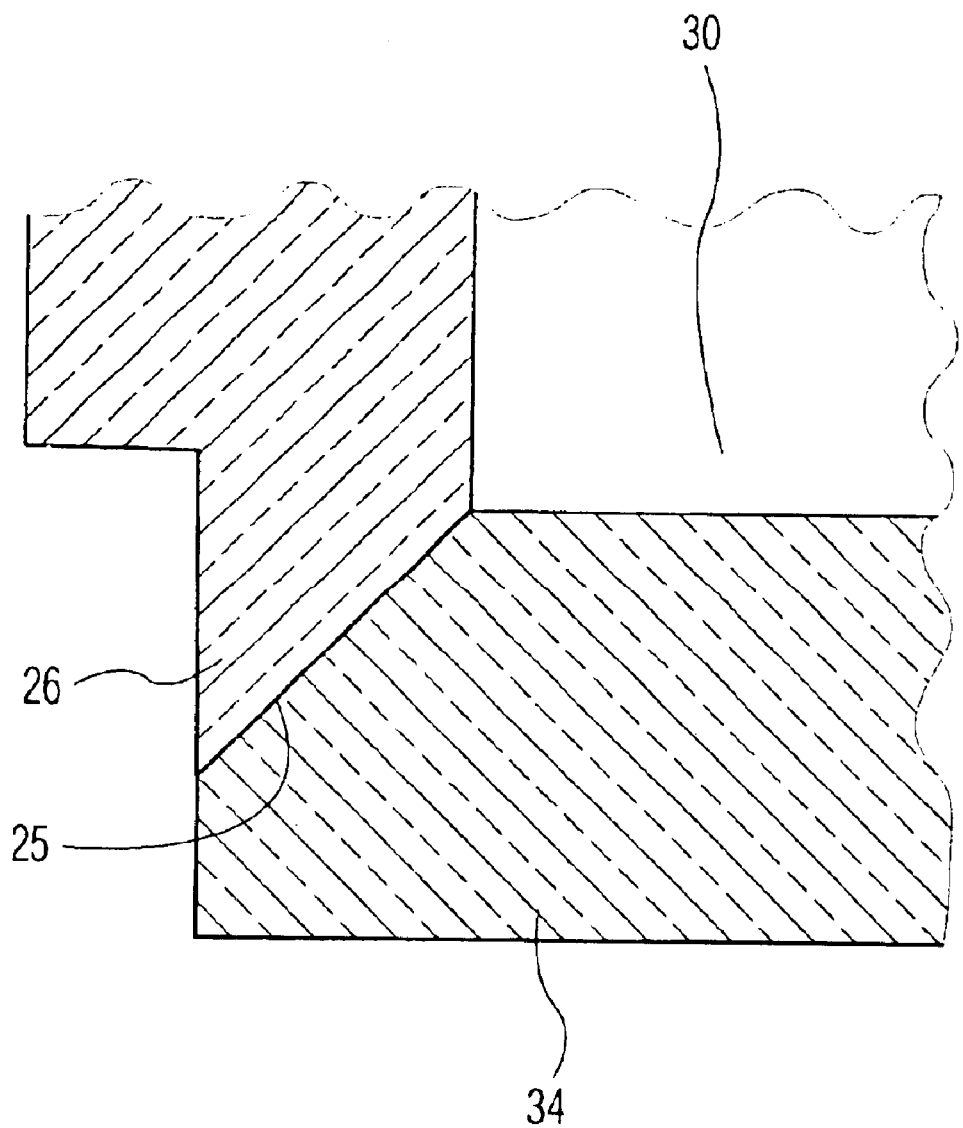
FIG. 8 is a cross-sectional view taken along line 8—8 of FIG. 7.

Continuing with FIGS. 3–8, it is seen that mirror panel 34 is adhered at three contact surfaces to corresponding mounting pads 21, 23, and 25 of edge portions 27 and 29 of first and second side members 24 and 26, respectively. In particular, edge portions of 27 and 29, and their corresponding mounting pads 21, 23 and 25, onto which mirror panel 34 is adhered, are themselves chamfered, as is best seen in FIGS. 4A and 4B. The construction and mounting of mirror panel 34 of the subject invention is different to that of the prior art in U.S. Pat. Nos. 5,024,514 and 5,361,171 (discussed earlier herein), in that the subject connection between mirror panel 34 and mirror panel housing 20 is chamfered surface to chamfered surface, as opposed to the prior art disclosure of mounting pads oriented perpendicularly to the reflective surface. What is similar, however, between the subject connection of mirror panel 34, and the prior art connections, is the adhesion of mirror panel 34 to mirror panel housing 20 at only three distinct areas; two areas along chamfered surface 38 and only one area along chamfered surface 36. The use of the matching chamfered surfaces 36/38 and 21/23 and 25 helps to reduce the distortional effect of the connection of mirror panel 34 to mirror panel housing 20, as well as to help reduce stresses caused by thermal expansion/contraction, as the substantially 45° of the chamfers insures that such distortional forces do not distort reflective surface 40 in a way to affect the orientation of the beam passing through LTR 10.

Specifically, LTR 10 of the present invention is a highly accurate instrument which can be used in such precise fields as surveying, military and aerospace applications, to name a few. It is usually necessary that instruments used in these areas meet very specific stress and dimensional specifications, and therefore the manner of construction of LTR 10 with respect to joining parts thereof together, and the length and depth dimensions of LTR 10, are important. Accordingly, as will be discussed in more detail below, although lateral transfer retroreflectors are old in the art, the particular manners in which mirror panel 34 and roof mirror assembly 100 are made and mounted to their respective housings, will impact the durability and dimensional integrity of LTR 10.

Turning now to a discussion of roof mirror assembly 100, this assembly is best seen in FIGS. 9–12. Roof mirror assembly 100 comprises a pair of mirror panels 102 and 112, and a pair of mounting blocks 140 and 160.

Figure 9:
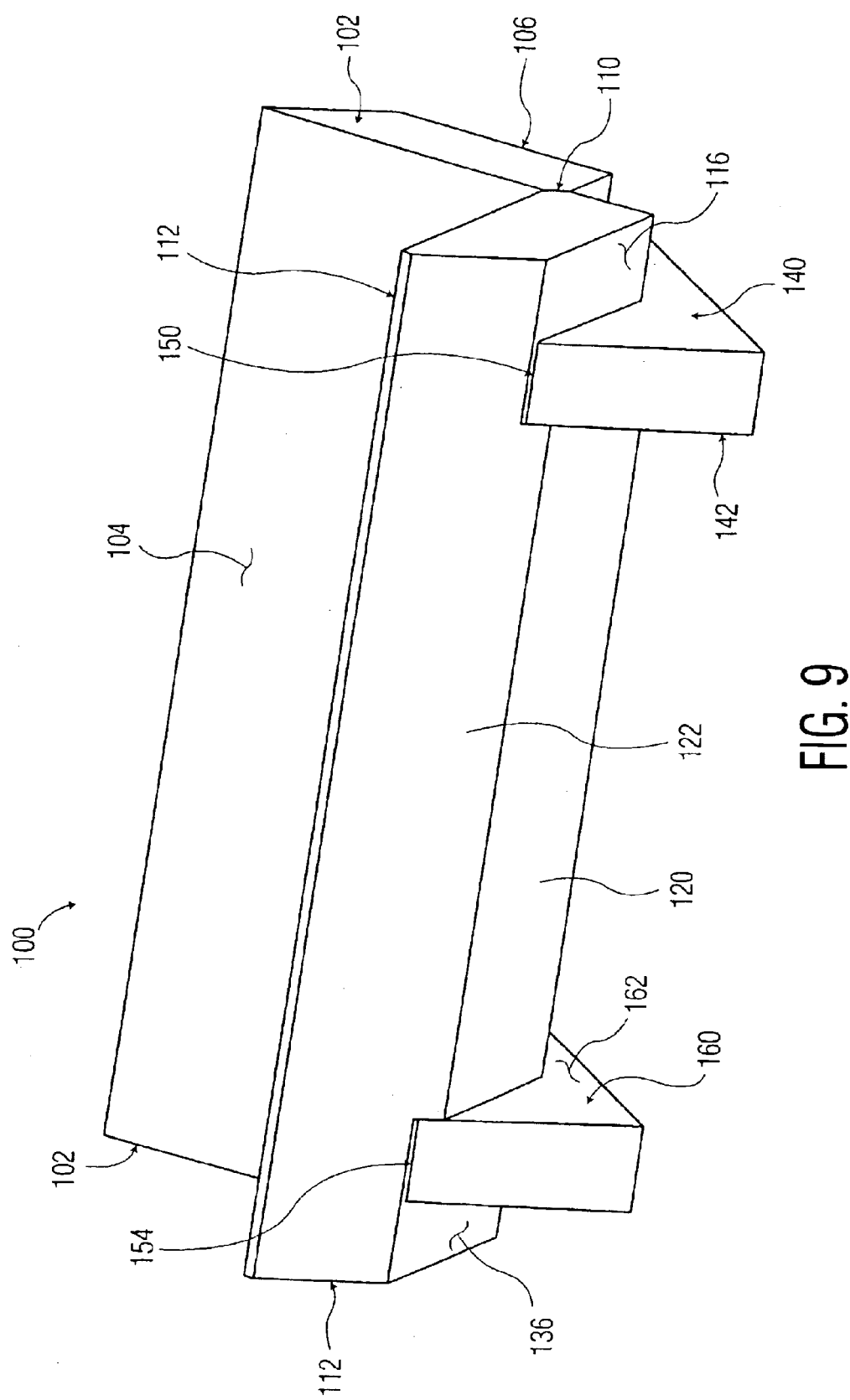
FIG. 9 is a perspective view of the roof mirror assembly of the subject invention.
Figure 10:
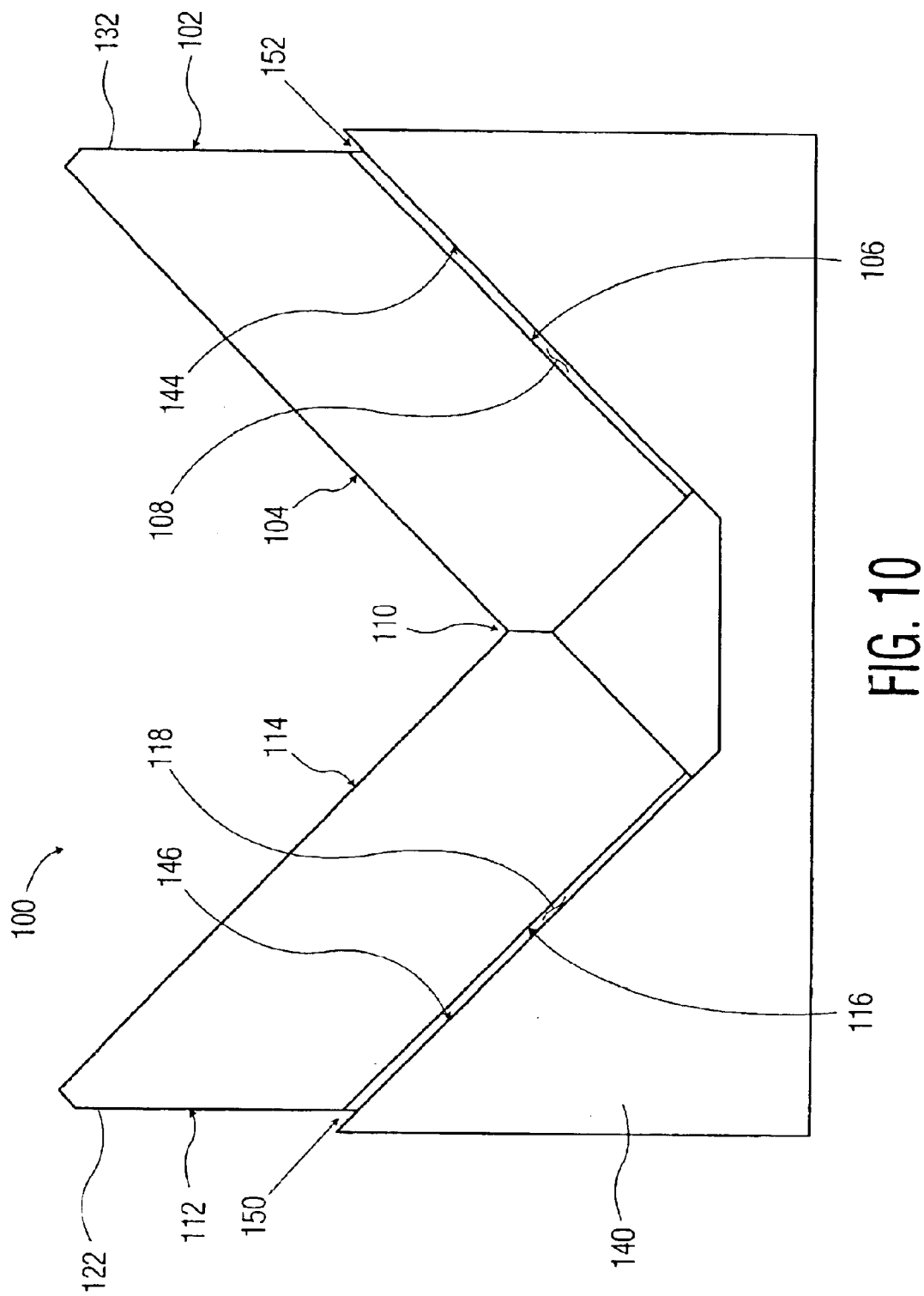
FIG. 10 is an elevational view of one end of the roof mirror assembly of FIG. 9.
Figure 11:
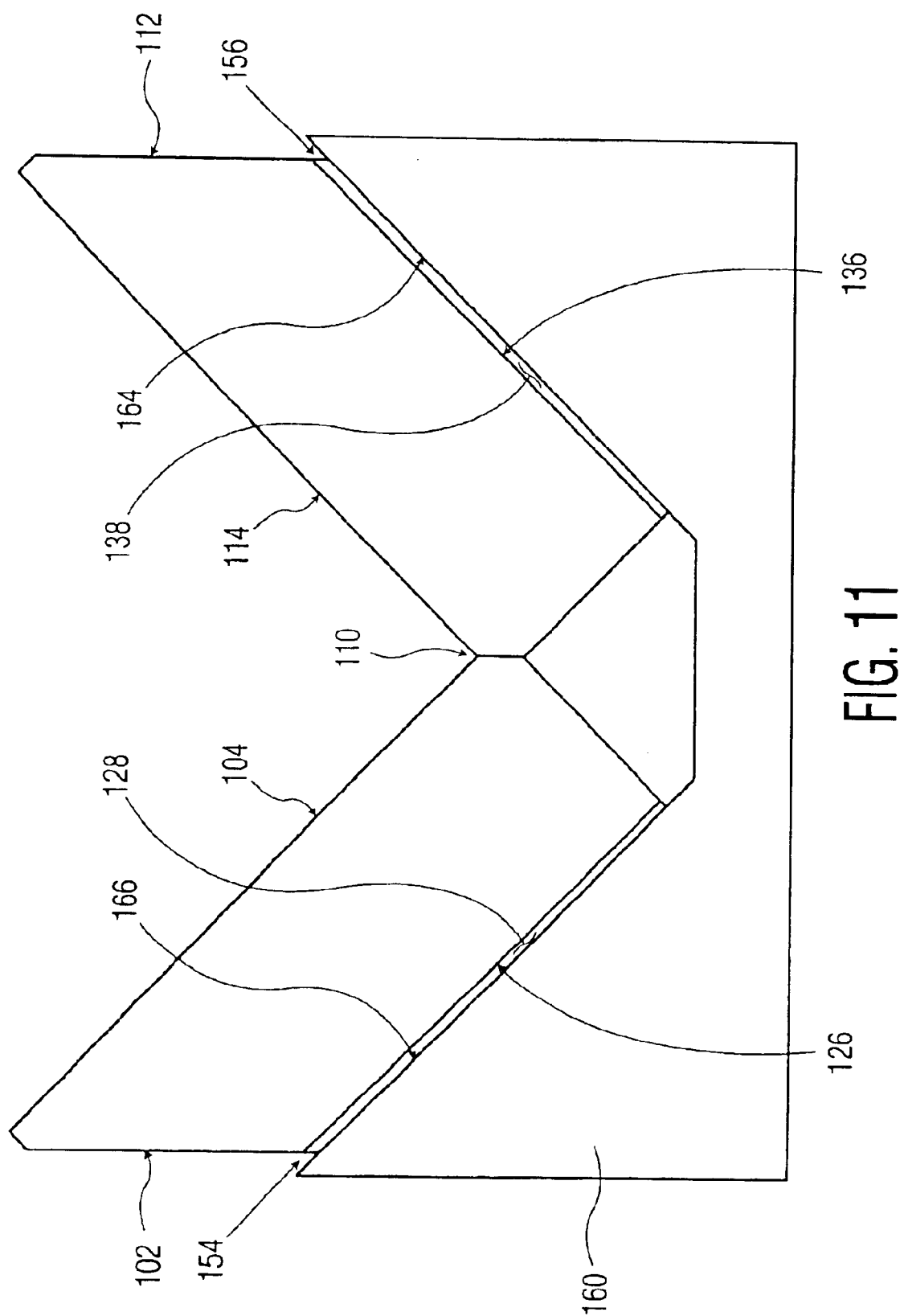
FIG. 11 is an elevational view of the other end of the roof mirror assembly of FIG. 9.
Figure 12:
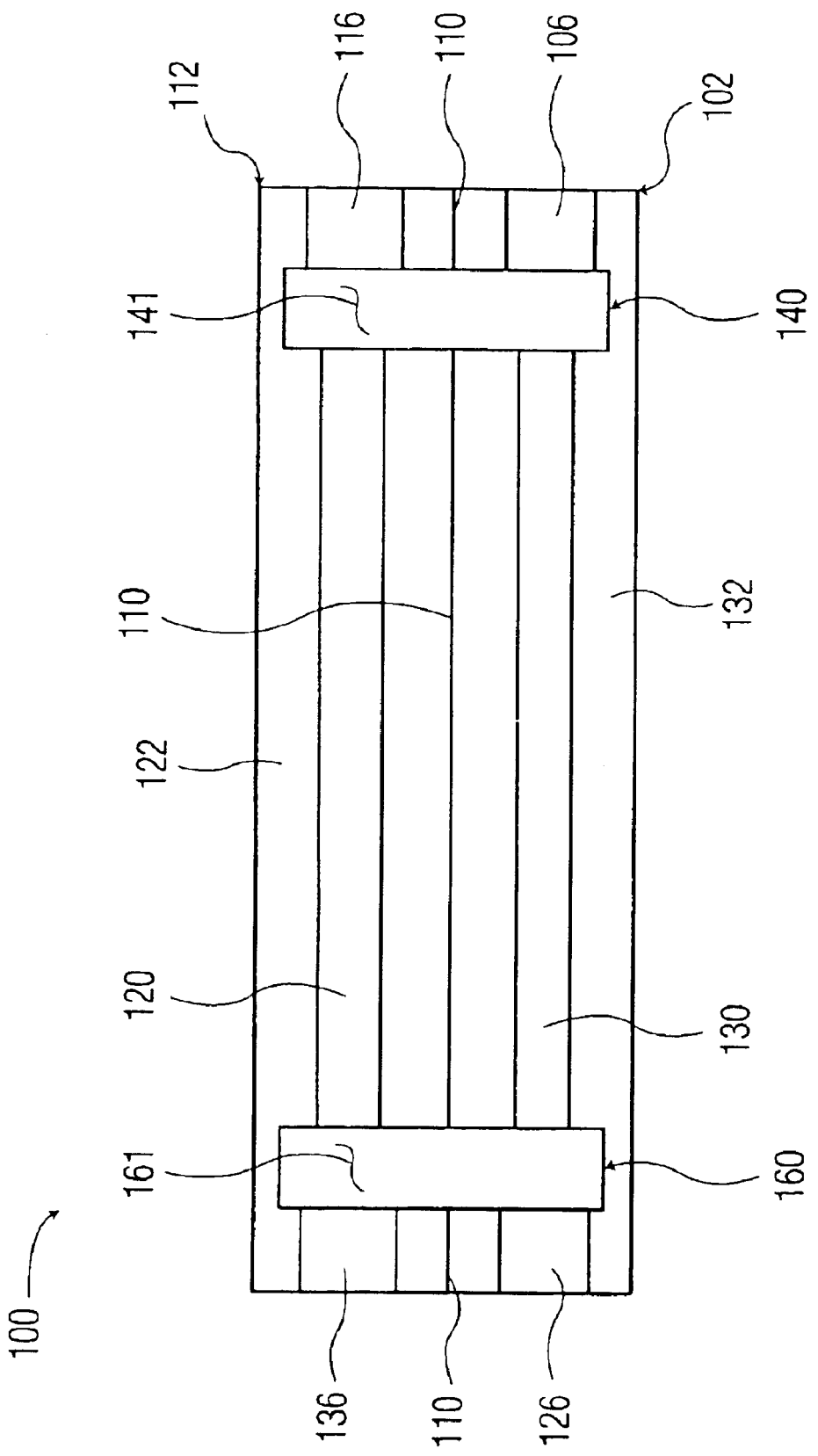
FIG. 12 is a bottom plan view of the roof mirror assembly of FIG. 9.

Mirror panels 102 and 112 have reflective surfaces 104 and 114, respectively, which reflective surfaces are in reflective relation with reflective surface 40 of mirror panel 34, as well as member 90 and aperture 32, and back, non-reflective surfaces 130, 132 and 120, 122, respectively. In particular, reflective surface 104 is substantially perpendicularly oriented to reflective surface 114, and reflective surface 40 is itself oriented substantially perpendicularly to both reflective surfaces 104 and 114. This mutually perpendicular orientation of the three reflective surfaces of LTR 10 essentially duplicates the construction of a standard Hollow™ retroreflector as is known in the art. Referring to FIGS. 9–11, mirror panels 102 and 112 are seen to be adhered together at miter joint 110. In order to create miter joint 110, the attachment surfaces of mirror panels 102 and 112 which are joined together to create miter joint 110, are at substantially 45 degree angles to reflective surfaces 104 and 114, so as to create the perpendicularity between the reflective surfaces upon creation of miter joint 110, and the associated reduction of distortive forces, as earlier discussed.

Continuing with a discussion of FIGS. 9–11, it is seen that connected together panels 102 and 112 are finally formed into a secure roof mirror assembly through the mounting of back surfaces of panels 102 and 112 to portions of surfaces 142 and 162 of mounting blocks 140 and 160. In so mounting panels 102 and 112 to blocks 140 and 160, air gaps 150, 152, 154 and 156 are created. Air gap 150 is between surface 146 of mounting block 140 and surface 116 of panel 112. Air gap 152 is between surface 144 of mounting block 140 and surface 106 of panel 102. Air gap 154 is between surface 166 of mounting block 160 and surface 126 of panel 102. Air gay 156 is between surface 164 of mounting block 160 and surface 136 of panel 112 (see FIGS. 10 and 11).

As is further seen in FIGS. 10 and 11, the back surfaces of panels 102 and 112 that are adhered to mounting blocks 140 and 160 as discussed above, are surfaces 108 and 128 for panel 102, and surfaces 118 and 138 for panel 112. In construction, surfaces 108/128 and 118/138 are all substantially perpendicular in orientation to miter joint 110. Such a construction ensures that any substantial distortional effects due to thermal expansion/contraction of panels 102 and 112 and/or block 140 and 160 will be in a direction substantially perpendicular to a longitudal axis for roof mirror assembly 100; i.e., perpendicular to the planes of reflective surfaces 104 and 114.

Turning again to FIG. 1, it is seen that roof mirror assembly 100 is secured to roof mirror assembly housing 60 by way of connection between bottom surfaces 141 and 161 of blocks 140 and 160 to member 70 of housing 60. Such a secure connection of roof mirror assembly 100 to housing 60 assists and strengthens the durability of LTR 10.

Regarding connecting member 90, as has been stated, this member can be cut from an off-the-shelf member of standard construction and length. Such an off-the-shelf retro-fit of connecting member 90 allows one to stock separate quantities of housings 20 and 60, and member 90, for construction of an LTR 10 to meet any customer specifications, in a quick and cost effective manner.

Figure 13:
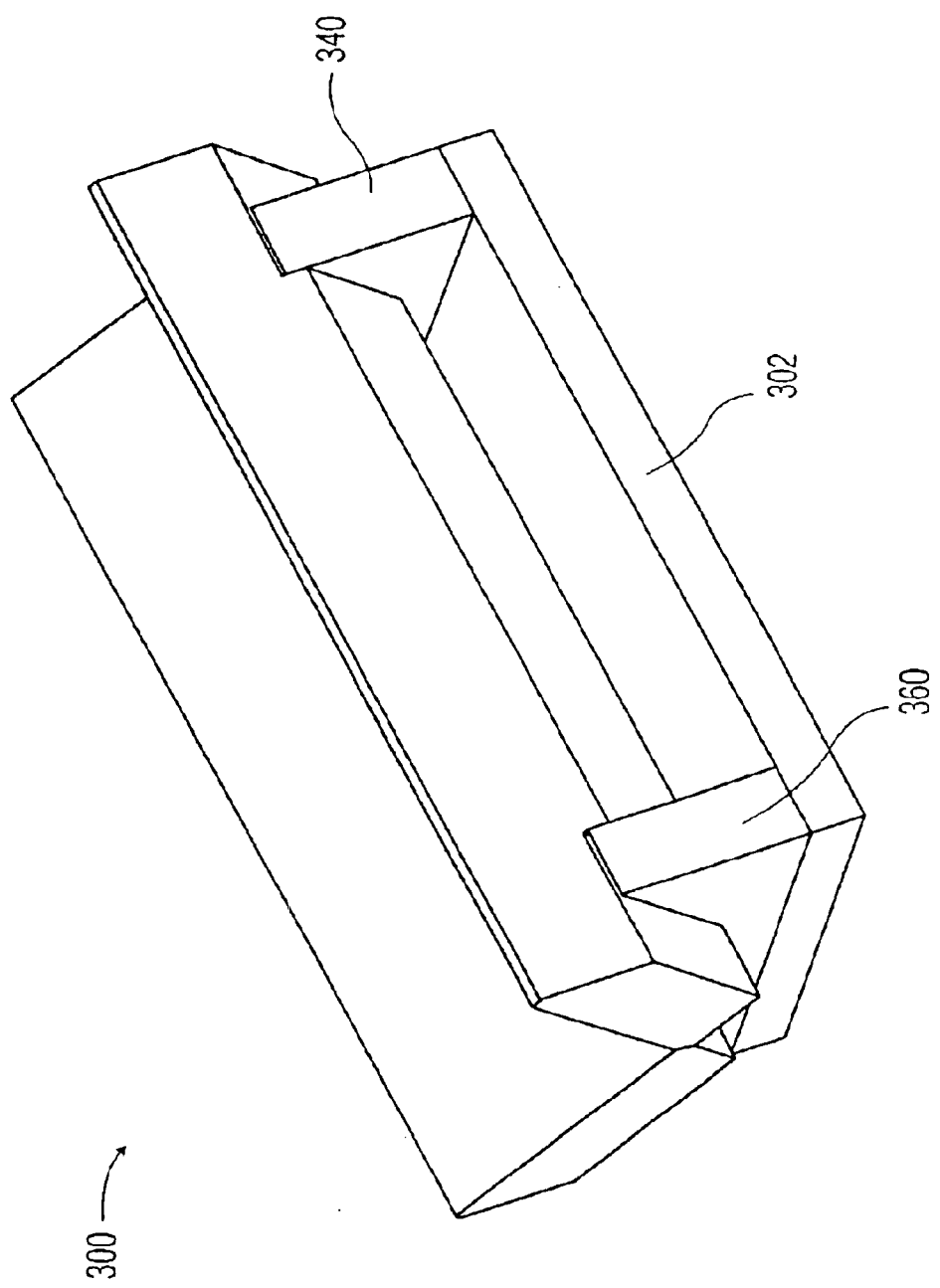
FIG. 13 is a perspective view of a second embodiment of the roof mirror assembly of the subject invention.

Turning now to a discussion of FIG. 13, a second embodiment of the inventive roof mirror assembly 100 is shown at 300. Assembly 300 is constructed identically to that of assembly 100, except for the addition of back plate member 302, adhered below mounting blocks 340 and 360.

It will thus be seen that the objects set forth above, among those made apparent from the preceding description, are efficiently attained, and, since certain changes may be made in the above constructions without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language might be said to fall therebetween.

What is claimed is:

1. A lateral transfer retroreflector assembly, comprising:
   a mirror panel housing having a first mirror panel mounted thereto, said mirror panel housing located at a first end of said lateral transfer retroreflector assembly;
   a roof mirror assembly housing located at an opposite, second end of said lateral transfer retroreflector assembly, having a roof mirror assembly mounted thereto, said roof mirror assembly, comprising:
      second and third mirror panels each having a reflective surface and an adjacent edge surface oriented substantially at a 45° angle to each of said reflective surfaces, said second and third mirror panels being joined together along said edge surfaces so that said reflective surfaces are substantially perpendicular to each other; and
   a connecting member, mounted to and between both said mirror panel housing and said roof mirror assembly housing.

2. A lateral transfer retroreflector assembly as recited in claim 1, said first mirror panel having a reflective surface oriented substantially perpendicularly to said reflective surfaces of said second and third mirror panels.

3. A lateral transfer retroreflector assembly as recited in claim 1, said mirror panel housing comprising a first side member, a second side member and a receiving member for said connecting member.

4. A lateral transfer retroreflector assembly as recited in claim 3, wherein said first mirror panel is mounted to said mirror panel housing along portions of first and second chamfered edges of said first mirror panel.

5. A lateral transfer retroreflector assembly as recited in claim 4, wherein said portions of said first and second chamfered edges of said first mirror panel are adhered to edge portions of said first and second side members of said mirror panel housing.

6. A lateral transfer retroreflector assembly as recited in claim 5, said first chamfered edge of said first mirror panel is adhered at two said portions to said first side member of said mirror panel housing.

7. A lateral transfer retroreflector assembly as recited in claim 6, said second chamfered edge of said first mirror panel is adhered at one said portion to said second side member of said mirror panel housing.

8. A lateral transfer retroreflector assembly as recited in claim 5, wherein said receiving member for said connecting member, is located along other edge portions of said first and second side members, and said other edge portions are oriented with respect to said edge portions at substantially 45° angles to said edge portions.

9. A lateral transfer retroreflector assembly as recited in claim 8, said mirror panel housing further comprising an aperture member mounted thereto along yet other edge portions of said first and second side members and located substantially between said first mirror panel and said receiving member for said connecting member.

10. A lateral transfer retroreflector assembly as recited in claim 1, wherein said edge surfaces of said second and third mirror panels of said roof mirror assembly are joined together in a miter joint.

11. A lateral transfer retroreflector assembly as recited in claim 1, said roof mirror assembly further comprising, at least one mounting block adhered to, and extending under, said joined second and third mirror panels, for mounting said roof mirror assembly to said roof mirror assembly housing.

12. A lateral transfer retroreflector assembly as recited in claim 11, wherein said roof mirror assembly is mounted to said roof mirror assembly housing along a bottom surface of said at least one mounting block.

13. A lateral transfer retroreflector assembly as recited in claim 12, wherein said at least one mounting block is adhered to said joined second and third mirror panels along portions of a first side thereof and along abutting portions of at least one bottom surface of said joined second and third mirror panels.

14. A lateral transfer retroreflector assembly as recited in claim 13, wherein said at least one bottom surface of said joined second and third mirror panels lies in a plane extending substantially perpendicularly to both of said reflective surfaces of said second and third mirror panels.

15. A lateral transfer retroreflector assembly as recited in claim 14, wherein said at least one mounting block does not touch said second and third mirror panels in any other locations.

16. A lateral transfer retroreflector assembly as recited in claim 11, wherein said at least one mounting block is a pair of mounting blocks, said roof mirror assembly mounted to said roof mirror assembly housing along a bottom surface of each of said mounting blocks.

17. A lateral transfer retroreflector assembly as recited in claim 1, said roof mirror assembly housing comprising a first side member, a second side member, a back member and a receiving member for said connecting member.

18. A lateral transfer retroreflector assembly as recited in claim 17, wherein said roof mirror assembly is attached to said roof mirror assembly housing along said back member.

* * * * *